(12) United States Patent
Sato

(10) Patent No.: US 9,049,101 B2
(45) Date of Patent: Jun. 2, 2015

(54) CLUSTER MONITOR, METHOD FOR MONITORING A CLUSTER, AND COMPUTER-READABLE RECORDING MEDIUM

(71) Applicant: NEC Corporation, Minato-ku, Tokyo (JP)

(72) Inventor: Yoichi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 13/765,821

(22) Filed: Feb. 13, 2013

(65) Prior Publication Data

US 2013/0262916 A1   Oct. 3, 2013

(30) Foreign Application Priority Data

Mar. 29, 2012   (JP) ................ 2012-077741

(51) Int. Cl.
| | | |
|---|---|---|
| *G06F 11/00* | (2006.01) | |
| *H04L 12/26* | (2006.01) | |
| *G06F 11/20* | (2006.01) | |
| *H04L 29/14* | (2006.01) | |
| *G06F 9/455* | (2006.01) | |
| *G06F 9/50* | (2006.01) | |
| *H04L 12/24* | (2006.01) | |

(52) U.S. Cl.
CPC ........... *H04L 43/04* (2013.01); *H04L 43/12* (2013.01); *H04L 41/0668* (2013.01); *G06F 11/2023* (2013.01); *H04L 69/40* (2013.01); *G06F 9/45558* (2013.01); *G06F 2009/4557* (2013.01); *G06F 9/5027* (2013.01)

(58) Field of Classification Search
CPC ............................. H04L 43/12; G06F 11/2023
See application file for complete search history.

(56) References Cited

U.S. PATENT DOCUMENTS

| | | | |
|---|---|---|---|
| 7,069,473 B2 * | 6/2006 | Yasuda ........................ 714/37 |
| 2005/0044193 A1 | 2/2005 | Benhase et al. | |
| 2008/0295095 A1 | 11/2008 | Watanabe et al. | |
| 2009/0150718 A1 | 6/2009 | Park et al. | |
| 2009/0164565 A1 | 6/2009 | Underhill | |

FOREIGN PATENT DOCUMENTS

JP   2008293117 A   12/2008

OTHER PUBLICATIONS

The Extended European Search Report for EP Application No. 13155374.5 dated on Aug. 16, 2013.

* cited by examiner

*Primary Examiner* — Michael Maskulinski
(74) *Attorney, Agent, or Firm* — Sughrue Mion, PLLC

(57) ABSTRACT

A cluster monitor (10) controls activation of a business application program and a monitoring agent in a cluster system (300) that includes a plurality of servers. The cluster monitor (10) includes a business server identifying unit (21) that identifies a server on which the business application program is operating among the servers, and an agent server selecting unit (22) that selects a server for activating the monitoring agent from among the servers based on the identified server.

10 Claims, 7 Drawing Sheets

CLUSTER MONITOR, METHOD FOR MONITORING A CLUSTER, AND COMPUTER-READABLE RECORDING MEDIUM

CROSS-REFERENCE TO RELATED APPLICATION

This application is based upon and claims the benefit of priority from Japanese patent application No. 2012-77741, filed on Mar. 29, 2012, the disclosure of which is incorporated herein in its entirety by reference.

BACKGROUND OF THE INVENTION

1. Field of the Invention

The present invention relates in particular to a cluster monitor and a method for monitoring a cluster for activating a monitoring agent in a high-availability cluster system, and a computer-readable recording medium in which a program for implementing the same is recorded.

2. Background Art

Conventionally, agent-based monitoring is performed to monitor business applications such as databases. In the agent-based monitoring, a monitoring program called "monitoring agent" is connected to a server that executes a business application, in the same manner as access from a client. The monitoring agent makes a dummy request to the business application, and checks whether or not a normal response is given from the business application (e.g., see JP 2008-293117A).

Specifically, JP 2008-293117A discloses a system in which a monitoring agent is constructed on a computer other than a server being a target of monitoring. Unlike the case where system components such as a server, a disk, and a network are separately monitored, with the system disclosed in JP 2008-293117A the monitoring agent is able to perform monitoring from a viewpoint on whether or not an appropriate service is being provided, standing in the position of system users.

In recent years, HA (High-Availability) cluster systems are available. An HA cluster system is a system that causes a number of servers to operate as if a single server operates. In this system, even if one of the servers stops due to a failure or the like, processing can be continued without stopping the entire system, while the stopped server can be repaired and replaced. Furthermore, the system disclosed in JP 2008-293117A is considered to be applicable to such an HA cluster system.

Meanwhile, in the system disclosed in JP 2008-293117A mentioned above, the server on which the monitoring agent is activated is fixed, and it is impossible to dynamically determine which server is most appropriate for activation of the monitoring agent and activate the monitoring agent on this server. Therefore, in the case where the system disclosed in JP 2008-293117A is applied to an HA cluster system, monitoring cannot be performed after the server on which the monitoring agent is activated goes down.

In addition, in the system disclosed in JP 2008-293117A the monitoring agent cannot be activated on the server on which the business application is being executed, which is required in some cases from the viewpoint of load distribution. If the system disclosed in JP 2008-293117A is applied to an HA cluster system, a problem arises in that the load cannot be sufficiently distributed.

SUMMARY OF THE INVENTION

It is one exemplary object of the present invention to provide a cluster monitor, a method for monitoring a cluster, and a computer-readable recording medium that are capable of solving the foregoing problem, dynamically switching a location for activating a monitoring agent in a cluster system, and distributing the load on the cluster system.

To achieve the above-stated object, a cluster monitor according to one aspect of the present invention is a cluster monitor for controlling activation of a business application program and a monitoring agent in a cluster system including a plurality of servers, the cluster monitor including: a business server identifying unit that identifies a server on which the business application program is operating from among the plurality of servers; and an agent server selecting unit that selects a server for activating the monitoring agent from among the plurality of servers, based on the identified server.

Furthermore, to achieve the above-stated object, a method for monitoring a cluster according to one aspect of the present invention is a method for monitoring a cluster by which activation of a business application program and a monitoring agent is controlled in a cluster system including a plurality of servers, the method including: a step (a) of identifying a server on which the business application program is operating from among the plurality of servers; and a step (b) of selecting a server for activating the monitoring agent from among the plurality of servers, based on the identified server.

Furthermore, to achieve the above-stated object, a computer-readable recording medium according to one aspect of the present invention is a recording medium storing a program for controlling, with a computer, activation of a business application program and a monitoring agent in a cluster system including a plurality of servers, the program containing an instruction to cause the computer to execute: a step (a) of identifying a server on which the business application program is operating from among the plurality of servers; and a step (b) of selecting a server for activating the monitoring agent from among the plurality of servers, based on the identified server.

As described above, according to the present invention, it is possible to dynamically switch a location for activating the monitoring agent in a cluster system and distribute the load on the cluster system.

EXEMPLARY EMBODIMENT

Outline of the Invention

For example, it is assumed that an HA cluster system is constituted by virtual servers that operate in a virtual environment provided by one or more physical servers. In this case, a switching unit (fail-over group) is conventionally defined for an application program for providing a business service (hereinafter referred to as "business application"). The business application can be activated on an arbitrary virtual server, and a virtual server for activating the business application can be switched.

On the other hand, in the present invention, it is also possible to define a fail-over group provided for monitoring the business application (hereinafter referred to as "monitoring fail-over group"). In the present invention, in order to maximize availability of the business service provided by the business application, a virtual server that is most appropriate for activation of the monitoring fail-over group is selected, and the monitoring fail-over group is activated on this virtual server.

Specifically, the "most appropriate virtual server" is selected so that, for example, a physical server on which the business application is activated is different from a physical server on which the monitoring fail-over group is activated. Hereinafter, a conventional "fail-over group" will be referred to as "business fail-over group" to distinguish it from the monitoring fail-over group.

In the present invention, the physical servers on which the business application and the monitoring fail-over group are activated can be constantly checked even after the monitoring fail-over group is activated. In this case, if a system configuration is changed, as in the case where the configuration of virtualization platform is changed, an activation server that is most appropriate for activation of the monitoring fail-over group is selected again so as to maximize the availability in accordance with the same standard. If the selected activation server is different from the current activation server, switching is performed.

First Embodiment

Hereinafter a cluster monitor, a method for monitoring a cluster, and a program according to a first embodiment of the present invention will be described with reference to FIGS. 1 and 2.

System Configuration

First, a cluster system that is the subject in the first embodiment will be described using FIG. 1. FIG. 1 is a diagram showing a configuration of the cluster system constructed with cluster monitors according to the first embodiment of the present invention.

Figure 1:
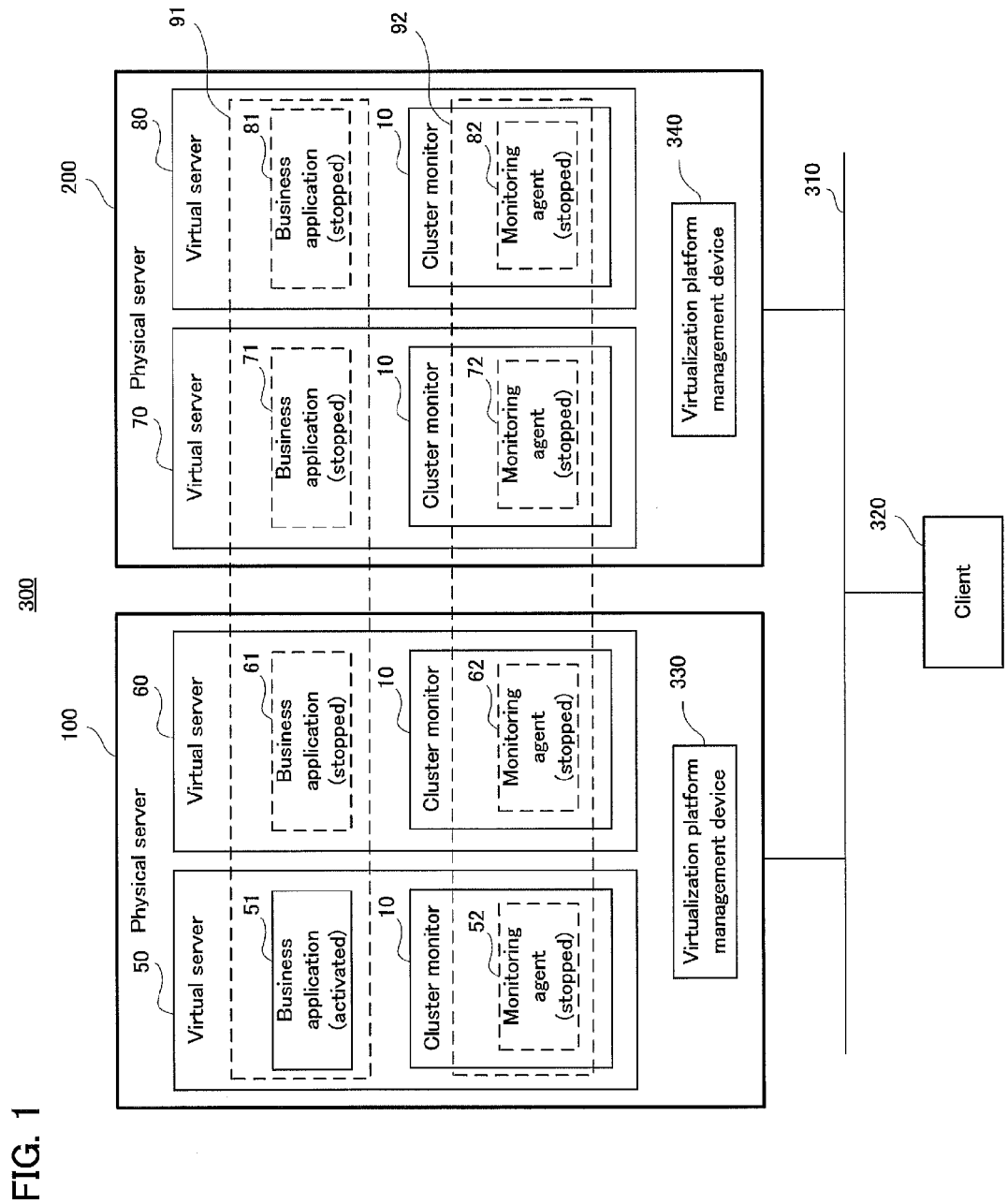
FIG. 1 is a diagram showing a configuration of a cluster system constructed with cluster monitors according to a first embodiment of the present invention.

As shown in FIG. 1, a high-availability cluster system 300 including a server 50, a server 60, a server 70, and a server 80 is constructed in the present embodiment. In the present embodiment, the server devices 50 to 80 are virtual servers that operate in a virtual environment provided by physical servers 100 and 200, and will be hereinafter referred to as "virtual servers".

Specifically, the virtual servers 50 and 60 are constructed by a virtualization platform management device 330 provided in the physical server 100, and the virtual servers 70 and 80 are constructed by a virtualization platform management device 340 provided in the physical server 200. The virtualization platform management devices 330 and 340 are constructed with software (virtualization software) for realizing a virtual environment. Each virtualization platform management device manages the virtual servers operating in the physical server on which it is installed.

The physical servers 100 and 200 are mutually connected via a network 310. To the network 310, a client 320 that uses the business service provided by each virtual server is also connected.

As shown in FIG. 1, the business application and the monitoring agent are installed in each virtual server, which can operates them. Specifically, the business application 51 and the monitoring agent 52 are installed in the virtual server 50, and the business application 61 and the monitoring agent 62 are installed in the virtual server 60. Similarly, the business application 71 and the monitoring agent 72 are installed in the virtual server 70, and the business application 81 and the monitoring agent 82 are installed in the virtual server 80.

Further, a cluster monitor 10 according to the first embodiment is constructed in each of the virtual servers 50 to 80, and the cluster monitors 10 control activation of the business applications and the monitoring agents in cooperation with one another. Specifically, the business applications 51, 61, 71, and 81 constitute a single business fail-over group 91, and each cluster monitor 10 switches the server for activating the business application. The monitoring agents 52, 62, 72, and 82 constitute a single monitoring fail-over group 92, and each cluster monitor 10 switches the server for activating the monitoring agent.

A priority according to which the business application is operated is set for each virtual server. In the present embodiment, all virtual servers have different priorities, and a priority of one of two arbitrary virtual servers is always higher than that of the other virtual server. In the first embodiment, it is assumed that the priorities are set for the virtual server 50, the virtual server 60, the virtual server 70, and the virtual server 80 in descending order.

Generally, each business application is associated with a corresponding monitoring agent. In the first embodiment, the business applications 51, 61, 71, and 81 are associated with the monitoring agents 52, 62, 72, and 82, respectively. FIG. 1 shows them only.

Note that the first embodiment is not limited to the above example. In the cluster system 300, there may be a plurality of other business applications and monitoring agents associated therewith. For example, if an active-active configuration is employed for several instances on a database, or if an active-active configuration is employed for file servers, a plurality of business applications and monitoring agents associated therewith exist simultaneously in the cluster system. An active-active configuration between different business applications, such as between a database and a file server, is also possible.

In the first embodiment, only the pair of the business applications 51, 61, 71, and 81 and the monitoring agents 52, 62, 72, and 82 will be noted for the sake of explanation. The business applications and monitoring agents other than those in this pair will be hereinafter referred to as "other business applications" and "other monitoring agents", respectively.

Device Configuration

Subsequently, a configuration of the cluster monitor in the first embodiment will be described using FIG. 2. FIG. 2 is a block diagram showing the configuration of the cluster monitor in the first embodiment of the present invention. In the present embodiment, the cluster monitors in all virtual servers have the same configuration, and FIG. 2 shows only one cluster monitor.

Figure 2:
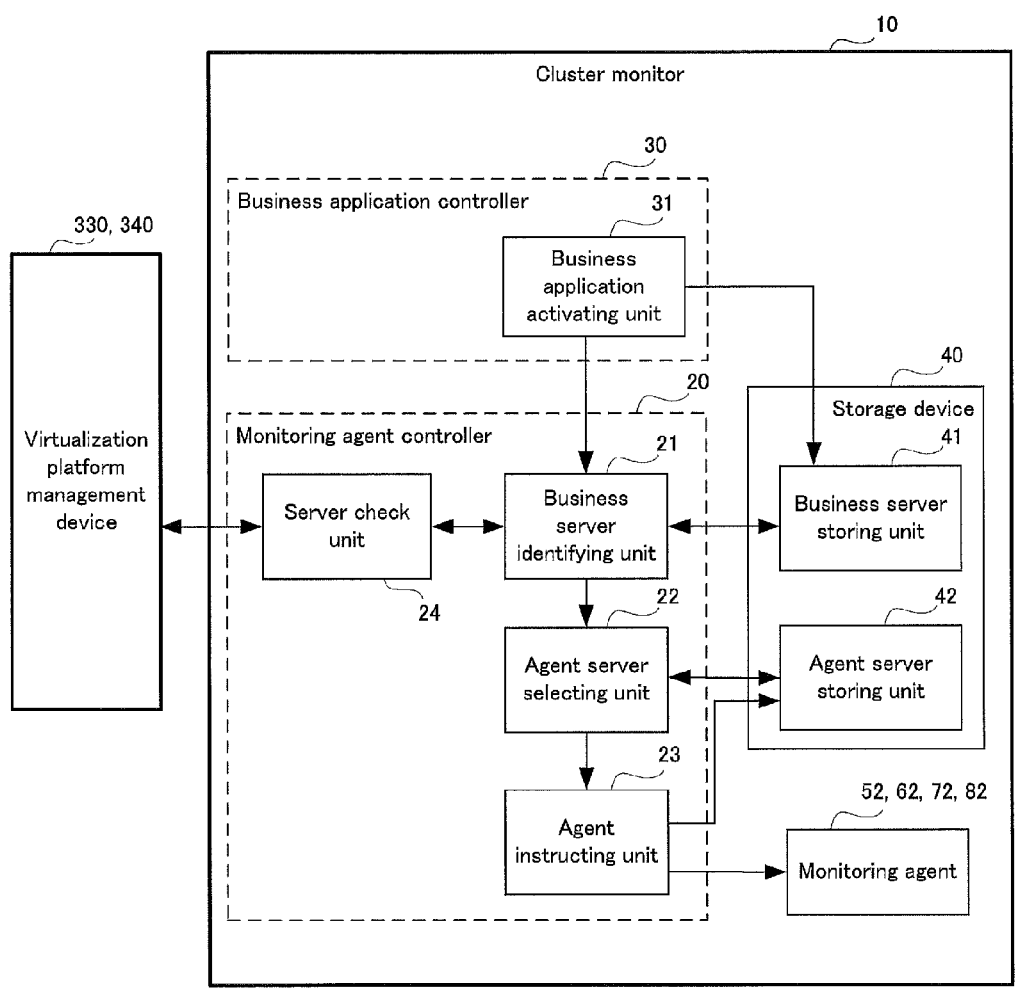
FIG. 2 is a block diagram showing a configuration of the cluster monitor according to the first embodiment of the present invention.

As shown in FIG. 2, each cluster monitor 10 in the first embodiment includes a monitoring agent controller 20 that manages and controls the monitoring agent. The monitoring agent controller 20 has a business server identifying unit 21 and an agent server selecting unit 22.

The business server identifying unit 21 identifies the virtual server on which the business application is operating from among the virtual servers 50 to 80. The agent server selecting unit 22 selects the server for activating the monitoring agent from among the virtual servers 50 to 80, based on the identified virtual server.

As described above, in the first embodiment, the cluster monitor 10 monitors the virtual server that is operating the business application in the cluster system 300, and identifies the relevant virtual server. The cluster monitor 10 is able to select a server that is appropriate for activation of the monitoring agent (e.g., a virtual server whose physical server is different from that of the virtual server operating the business application, or the like, as described later), based on the identified virtual server. In other words, according to the first embodiment, the location for activating the monitoring agent can be dynamically switched in the cluster system 300. Consequently, a load on the cluster system 300 can be distributed.

Here, the configuration of the cluster monitor 10 according to the first embodiment will be described in more detail. Firstly, as shown in FIG. 2, in the present embodiment the monitoring agent controller 20 includes a corresponding monitoring agent, an agent instructing unit 23, and a server check unit 24, as well as the business server identifying unit 21 and the agent server selecting unit 22.

Upon the virtual server being selected by the agent server selecting unit 22, the agent instructing unit 23 instructs the monitoring agent on each virtual server to be activated and to stop in accordance with the selection. In order to identify the physical server on which the virtual server is operating, the server check unit 24 requests the virtualization platform management devices 330 and 340 to perform a check, and collects information for identifying the physical server. The collected information is used to select the virtual server by the agent server selecting unit 22.

In the first embodiment, the cluster monitor 10 includes, in addition to the monitoring agent controller 20, a business application controller 30 that manages and controls the business application and a storage device 40 that stores information on the cluster and the virtual server. Among them, the business application controller 30 has a business application activating unit 31 for activating the business application.

Further, the storage device 40 has a business server storing unit 41 and an agent server storing unit 42. The business server storing unit 41 stores information for identifying the business application that is operating and the virtual server operating this business application. The agent server storing unit 42 stores information for identifying the monitoring agent and the virtual server that is operating this monitoring agent.

Device Operation

Figure 3:
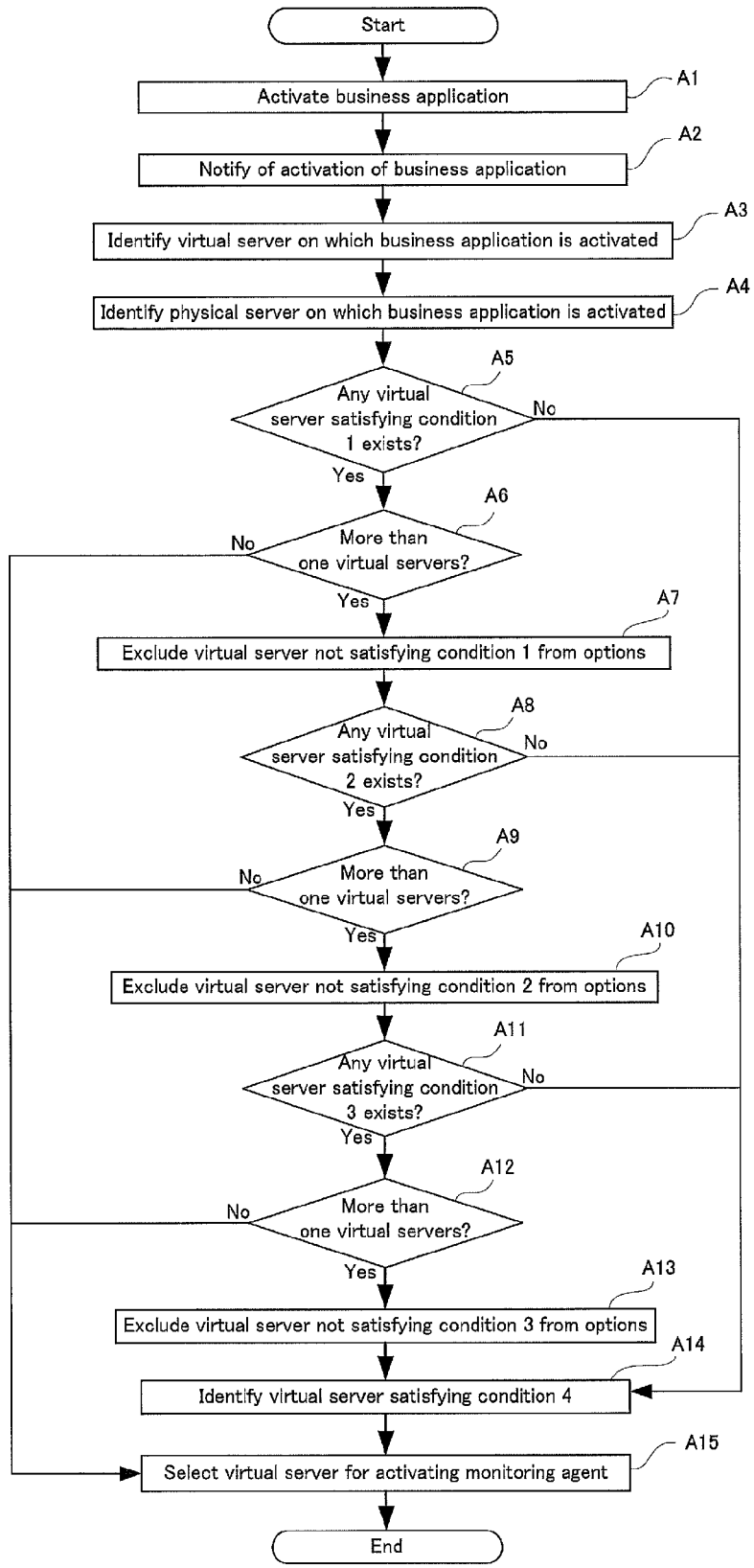
FIG. 3 is a flowchart showing an operation of the cluster monitor according to the first embodiment of the present invention.

Next, the operation of the cluster monitor 10 according to the first embodiment of the present invention will be described using FIG. 3. FIG. 3 is a flowchart showing the operation of the cluster monitor according to the first embodiment of the present invention. In the following description, FIGS. 1 and 2 will be referred to as needed. Further, in the first embodiment, the method for monitoring a cluster is implemented by operating the cluster monitor 10. Accordingly, the following description of the operation of the cluster monitor 10 will also serve as a description of the method for monitoring a cluster according to the present embodiment.

It is presumed that the cluster monitors 10 in the virtual servers 50 to 80 work in conjunction with one another so that the following steps are performed. In other words, in each step, the cluster monitors 10 work in cooperation with one another to perform logically the same processing, or only the relevant cluster monitor 10 solely performs processing, depending on the content of the step.

Specifically, among the following steps, steps A2 to A14 are steps in which the cluster monitors 10 perform processing in cooperation with one another, and step A15 is a step in which only the relevant cluster monitor 10 solely performs processing.

First, upon an instruction to execute the business application being given from the outside in a state where all components in each cluster monitor 10 are normally activated, the business application activating unit 31 activates the business application 51 on the virtual server 50, which has the highest priority among the four virtual servers 50 to 80 (step A1).

Simultaneously, in step A1, the business server storing unit 41 in the storage device 40 stores information for identifying that the business application 51 is activated on the virtual server 50. Note that at this point, the monitoring agent is not activated yet on any virtual server.

Next, the business application activating unit 31, after completing activation of the business application 51, notifies the business server identifying unit 21 in the monitoring agent controller 20 of information indicating the completion of activation (step A2).

After step A2 is performed, in the monitoring agent controller 20, the business server identifying unit 21 receives the notification from the business application activating unit 31 and accesses the business server storing unit 41 in response to the receipt of the notification. Thereafter the business server identifying unit 21 identifies the virtual server on which the business application is activated, based on the information stored in the business server storing unit 41 (step A3). Note that in the present embodiment, the business server identifying unit 21 identifies the virtual server 50 on which the business application 51 is activated.

Subsequently, the business server identifying unit 21 causes the server check unit 24 to perform a check with respect to the virtualization platform management devices 330 and 340. In order to identify the physical server on which the virtual server is operating, the server check unit 24 requests the virtualization platform management devices 330 and 340 to perform a check, collects the information for identifying the physical server, and returns the collected information to the business server identifying unit 21. Thus, the business server identifying unit 21 identifies the physical server on which the identified virtual server is operating (step A4).

In the present embodiment, the business server identifying unit 21 identifies the physical server 100 as the physical server on which the virtual server 50 is operating, for example. Further, the business server identifying unit 21 delivers the information on the virtual server identified in step A3 and the physical server identified in step A4 to the agent server selecting unit 22.

Next, the agent server selecting unit 22 applies four conditions 1 to 4 listed below in this order, thereby selecting the virtual server on which the monitoring agent is to be activated.

Condition 1: A priority is given to virtual servers that are operating on physical servers other than the physical server identified in step A4 (the physical server on which the business application is activated).

Condition 2: A priority is given to virtual servers other than the virtual server identified in step A3 (the virtual server on which the business application is activated).

Condition 3: A priority is given to virtual servers that are operating on physical servers on which other business applications managed by the cluster system are not activated (virtual servers that are operating on physical servers on which applications not being monitored by the monitoring agents 52 to 82 are not operated).

Condition 4: A priority is given to the virtual server having the lowest priority according to which the business application is operated.

First, the agent server selecting unit 22 determines whether or not any virtual server that satisfies condition 1 exists (step A5). If no virtual server satisfies condition 1 as a result of determination in step A5, the agent server selecting unit 22 performs step A14. On the other hand, if one or more virtual servers satisfy condition 1 as the result of determination in step A5, the agent server selecting unit 22 determines whether or not more than one virtual servers satisfy condition 1 (step A6).

The agent server selecting unit 22 performs step A15 if a single virtual server satisfies condition 1, whereas it eliminates the virtual servers that do not satisfy condition 1 from options if more than one virtual servers satisfy condition 1 (step A7).

Next, the agent server selecting unit 22 determines whether or not any virtual server among the options narrowed down in step A7 satisfies condition 2 (step A8). If no virtual server satisfies condition 2 as a result of determination in step A8, the agent server selecting unit 22 performs step A14. On the other hand, if one or more virtual servers satisfy condition 2 as the result of determination in step A8, the agent server selecting unit 22 determines whether or not more than one virtual servers satisfy condition 2 (step A9).

The agent server selecting unit 22 performs step A15 if a single virtual server satisfies condition 2, whereas it eliminates the virtual servers that do not satisfy condition 2 from the options if more than one virtual servers satisfy condition 2 (step A10).

Next, the agent server selecting unit 22 determines whether or not any virtual server among the options narrowed down in step A10 satisfies condition 3 (step A11). If no virtual server satisfies condition 3 as a result of determination in step A11, the agent server selecting unit 22 performs step A14. On the other hand, if one or more virtual servers satisfy condition 3 as the result of determination in step A11, the agent server selecting unit 22 determines whether or not more than one virtual servers satisfy condition 3 (step A12).

The agent server selecting unit 22 performs step A15 if a single virtual server satisfies condition 3, whereas it eliminates the virtual servers that do not satisfy condition 3 from the options if more than one virtual servers satisfy condition 3 (step A13).

In step A14, the agent server selecting unit 22 identifies the virtual server that satisfies condition 4. Note that if no virtual server that can be a candidate for selection is left in the process of narrowing down the options based on conditions 1 to 3 described above, the agent server selecting unit 22 identifies, according to condition 4, one virtual server to be selected among the virtual servers that were left as the candidates immediately before no candidate virtual server was left.

The priorities according to which the business application is operated are set so that the priority of one of two arbitrary servers is always higher than that of the other server. Accordingly, even if the virtual servers to be selected cannot be narrowed down to one in the process of narrowing down based on conditions 1 to 3, one virtual server is identified based on condition 4. Note that in the present embodiment, only part of conditions 1 to 4 may be applied. Further, the order of application is not limited to the above-described example.

Thereafter, the agent server selecting unit 22 selects the virtual server on which the monitoring agent is to be activated, based on the results in steps A5, A8, A11, and A14 (step A15). After step A15 is performed, only in the cluster monitor 10 on the selected virtual server, the agent instructing unit 23 instructs the selected virtual server to activate the monitoring agent. Steps A1 to A15 are repeatedly performed every time an instruction to execute the business application is given.

In the first embodiment, if the monitoring agent is already activated and a failure occurs in the virtual server that is operating the monitoring agent, steps A3 to A15 can be performed in response to the occurrence of the failure. In other words, in this case, if the virtual server on which the monitoring agent is activated stops, in step A3 the business server identifying unit 21 accesses the business server storing unit 41 and identifies the virtual server on which the business application is activated. Thereafter, step A4 and subsequent steps are performed.

Furthermore, in the first embodiment, steps A1 to A15 are also performed when a failure relating to the business application occurs and fail-over of the business application is performed accordingly. In this case, in step A1 the virtual server to take over activation of the business application due to fail-over is identified and activated. Thereafter, the virtual server on which the monitoring agent is to be activated is determined again through steps A2 to A15, and the virtual server on which the monitoring agent operates is switched.

The "failure relating to the business application" includes a failure occurring in the business application itself, as well as a failure occurring in the server that executes the business application, and a failure occurring in a network path or a network device used by the business application.

Here, above steps A3 to A15 will be described using a specific example. First, the agent server selecting unit 22 lists, based on condition 1, virtual servers operating on the physical server other than the physical server 100 on which the business application is activated, that is, on the physical server 200. Then the agent server selecting unit 22 performs a check with respect to the server check unit 24, and determines, from the check result, that the virtual servers 70 and 80 are operating on the physical server 200 and therefore satisfy condition 1 (step A5).

Next, because more than one virtual servers are selected, the agent server selecting unit 22 proceeds to step A7 and eliminates from the options the virtual servers 50 and 60 that were not selected.

Condition 1 is provided in order to realize monitoring from a standpoint closer to a client, which usually accesses the business application from the outside, by activating the monitoring agent on a physical server other than the physical server on which the business application is activated.

Next, the agent server selecting unit 22 lists, based on condition 2, virtual servers on which the business application is not activated among the virtual servers 70 and 80 that satisfy condition 1. Then the agent server selecting unit 22 makes a query to the business server storing unit 41, and determines, from the check result, that the business application is not activated in the virtual server 70 or the virtual server 80, and therefore, both the virtual servers 70 and 80 satisfy condition 2 (step A8).

Next, because more than one virtual servers are selected, the agent server selecting unit 22 proceeds to step A10. However, there is no server that does not satisfy condition 2 in this case, and therefore no server is eliminated from the options.

Condition 2 is provided in order to realize monitoring from a standpoint closer to a client, which usually accesses the business application from the outside, by activating the monitoring agent on a virtual server other than the virtual server on which the business application is activated.

Next, the agent server selecting unit 22 lists, based on condition 3, virtual servers on which other business applications are not activated among the virtual servers 70 and 80 that satisfy condition 2. Because no other business applications are activated in the physical server 200 that operates the virtual servers 70 and 80, it is determined that both the virtual servers 70 and 80 satisfy condition 3 (step A11).

Next, because more than one virtual servers are selected, the agent server selecting unit 22 proceeds to step A13. However, there is no virtual server that does not satisfy condition 3 in this case as well, and therefore no server is eliminated from the options.

Condition 3 is provided in order to distribute the load placed on the physical servers by the business application and the monitoring agent, by activating the monitoring agent on a physical server other than the physical servers on which other business applications are activated.

Next, the agent server selecting unit 22 selects, based on condition 4, the virtual server having the lowest priority according to which the business application is operated, from among the virtual servers 70 and 80 that satisfy condition 3. The priority of the virtual server 70 is higher than that of the virtual server 80, and it is therefore determined that the virtual server 80 satisfies condition 4 (step A14).

Condition 4 is provided so that a possibility that both the monitoring agent and the business application are activated on a single server can be reduced when fail-over occurs in the future because a server goes down, or for other reasons, by selecting the virtual server having a low priority for activation of the business application.

Through the above-described procedure, the agent server selecting unit 22 selects the virtual server 80 as the virtual server on which the monitoring agent is to be activated (step A15), and delivers this information to the agent instructing unit 23. Thus the agent instructing unit 23 activates the monitoring agent 82 on the virtual server 80. Simultaneously, the agent instructing unit 23 registers, in the agent server storing unit 42, the virtual server 80 as the server for activating the monitoring agent.

Program

The program according to the first embodiment need only be a program for causing a computer to perform steps A1 to A15 shown in FIG. 3. The cluster monitor 10 and the method for monitoring a cluster according to the first embodiment can be implemented by installing this program in the computer and executing it. In this case, a CPU (Central Processing Unit) of the computer works as the monitoring agent controller 20 and the business application controller 30 and performs processing.

Advantageous Effect of the First Embodiment

As described above, according to the first embodiment, the location for activating the monitoring agent can be dynamically switched in the cluster system 300. Moreover, even if the virtual server on which the monitoring agent is activated goes down, monitoring can be continued by automatically switching the location for activating the monitoring agent to another virtual server.

Furthermore, in the first embodiment, a module of the monitoring agent can be provided as part of software that constitutes the cluster monitor 10. In this case, the cluster monitor 10 according to the first embodiment can be constructed and operated with substantially the same time and effort as in the case of constructing an ordinary cluster system. Accordingly, in the present embodiment, a cost increase caused by construction of the cluster monitor 10 can be suppressed.

Furthermore, the above-mentioned effect of unnecessity of time and effort for construction and operation is a feature that could not be realized with the technique conventionally called "agentless" technique in the category of operations management software. Note that the "agentless" technique is a technique for constructing a monitoring manager with a server other than the server for business, and monitoring business applications from the monitoring manager.

In the first embodiment, it is possible to perform monitoring from a server other than the server on which the business application is activated, from the viewpoint of a client. Usually a client uses services by connecting to the business application remotely from the environment where the business application is operating. Accordingly, according to the first embodiment, the business application can be monitored from a standpoint close to an actual client. Consequently, it is also possible to detect an anomaly that cannot be detected if monitoring is performed from the same server on which the business application is operating, as in the case where a physical network failure has occurred, or where a port used by the business application is subjected to filtering by a firewall.

In other words, if the monitoring agent is being executed on the same physical server or virtual server on which the business application is operating, the monitoring agent performs monitoring by means of communication without via the physical network and a firewall mechanism on a virtual OS. Therefore, in practice, even if a state occurs in which the server cannot be accessed from a terminal located away therefrom on the network, the monitoring agent cannot detect this state. On the other hand, in the first embodiment, it is possible to detect an anomaly reliably even in such cases because the physical servers and virtual servers other than those on which the business application is operating are preferentially selected for activation of the monitoring agent.

Furthermore, in the first embodiment, a physical server on which the business application is not activated is identified, and then the monitoring agent is operated preferentially on this physical server. Therefore, it is possible to distribute the load placed on the physical servers by the business application and the monitoring agent, and thus efficiently use resources in the physical servers.

Second Embodiment

Next, a cluster monitor, a method for monitoring a cluster, and a program according to a second embodiment of the present invention will be described with reference to FIGS. 4 to 6.

Device Configuration

First, a configuration of the cluster monitor according to the second embodiment will be described using FIG. 4. FIG. 4 is a block diagram showing the configuration of the cluster monitor according to the second embodiment of the present invention.

Figure 4:
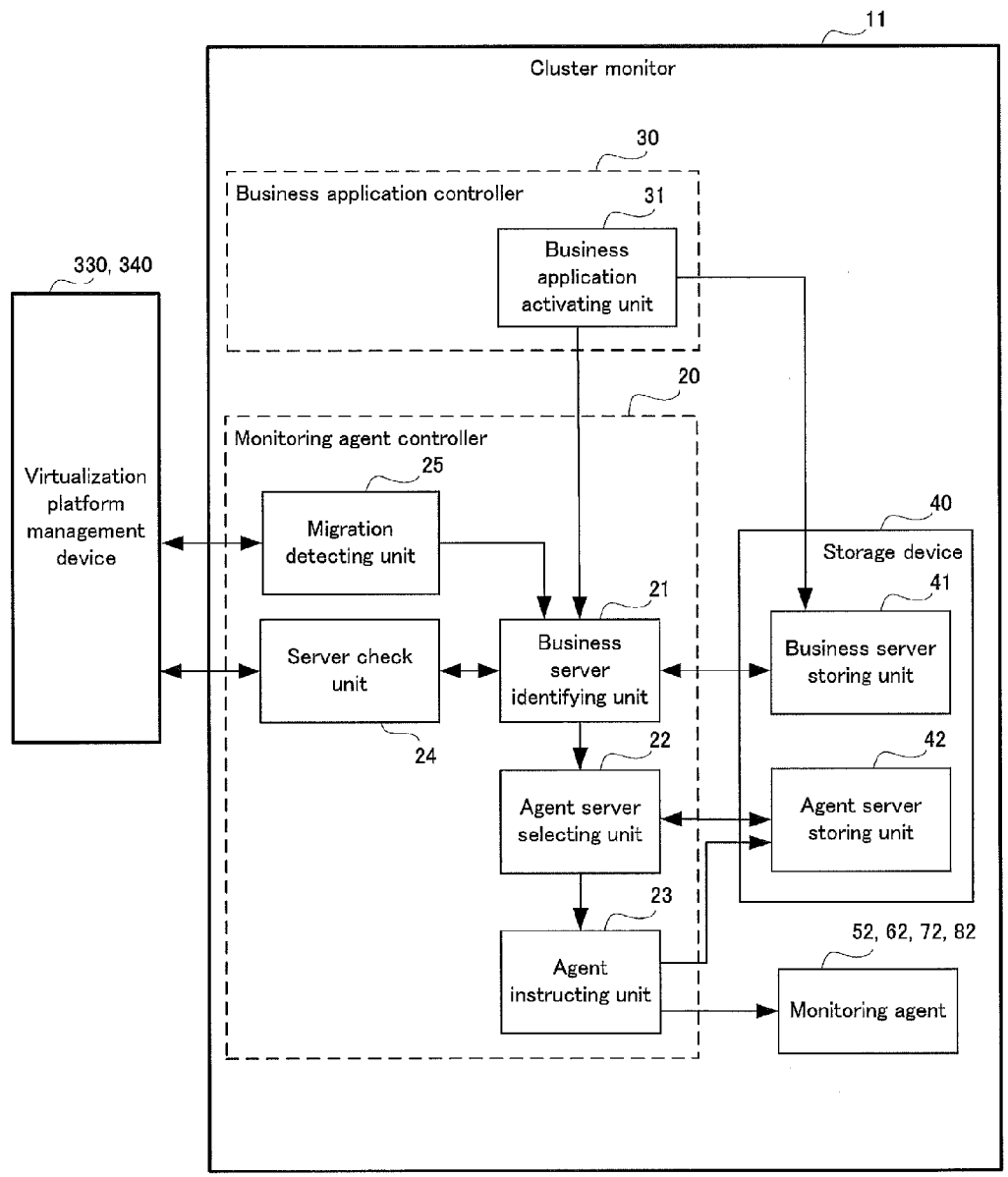
FIG. 4 is a block diagram showing a configuration of a cluster monitor according to a second embodiment of the present invention.

As shown in FIG. 4, the cluster monitor 11 according to the second embodiment has a migration detecting unit 25 in the monitoring agent controller 20, unlike the cluster monitor 10 according to the first embodiment shown in FIG. 2.

The migration detecting unit 25 is able to detect a migration by which the physical server that is operating the virtual server is changed to another physical server. Upon a migration being detected by the migration detecting unit 25, the business server identifying unit 21 again identifies the virtual server on which the business application is operating, and the agent server selecting unit 22 again selects the virtual server for activating the monitoring agent.

For example, it is assumed that the virtual server 50 is migrated from the physical server 100 to the physical server 200 through an operation to the virtualization platform management device 330 or 340 from the outside in a state in which the monitoring agent 82 is activated. In this case, if this state continues, both the business application and the monitoring agent will be activated on the same physical server 200, and the advantageous effect described in the first embodiment cannot be achieved.

However, in the second embodiment, whether or not the monitoring agent is operating on an appropriate virtual server is determined again at the time of occurrence of migration. If another appropriate virtual server exists, the virtual server on which the monitoring agent operates is switched. Consequently, it is possible to achieve the advantageous effect described in the first embodiment.

Device Operation

Next, the operation of the cluster monitor 11 according to the second embodiment of the present invention will be described using FIGS. 5 and 6. FIG. 5 is a flowchart showing the operation of the cluster monitor according to the second embodiment of the present invention. FIG. 6 is a diagram schematically showing the operation of the cluster monitor according to the second embodiment of the present invention.

In the following description, FIG. 4 will be referred to as needed. Further, in the second embodiment, the method for monitoring a cluster is implemented by operating the cluster monitor 11. Accordingly, the following description of the operation of the cluster monitor 11 will also serve as a description of the method for monitoring a cluster according to the present embodiment.

Figure 5:
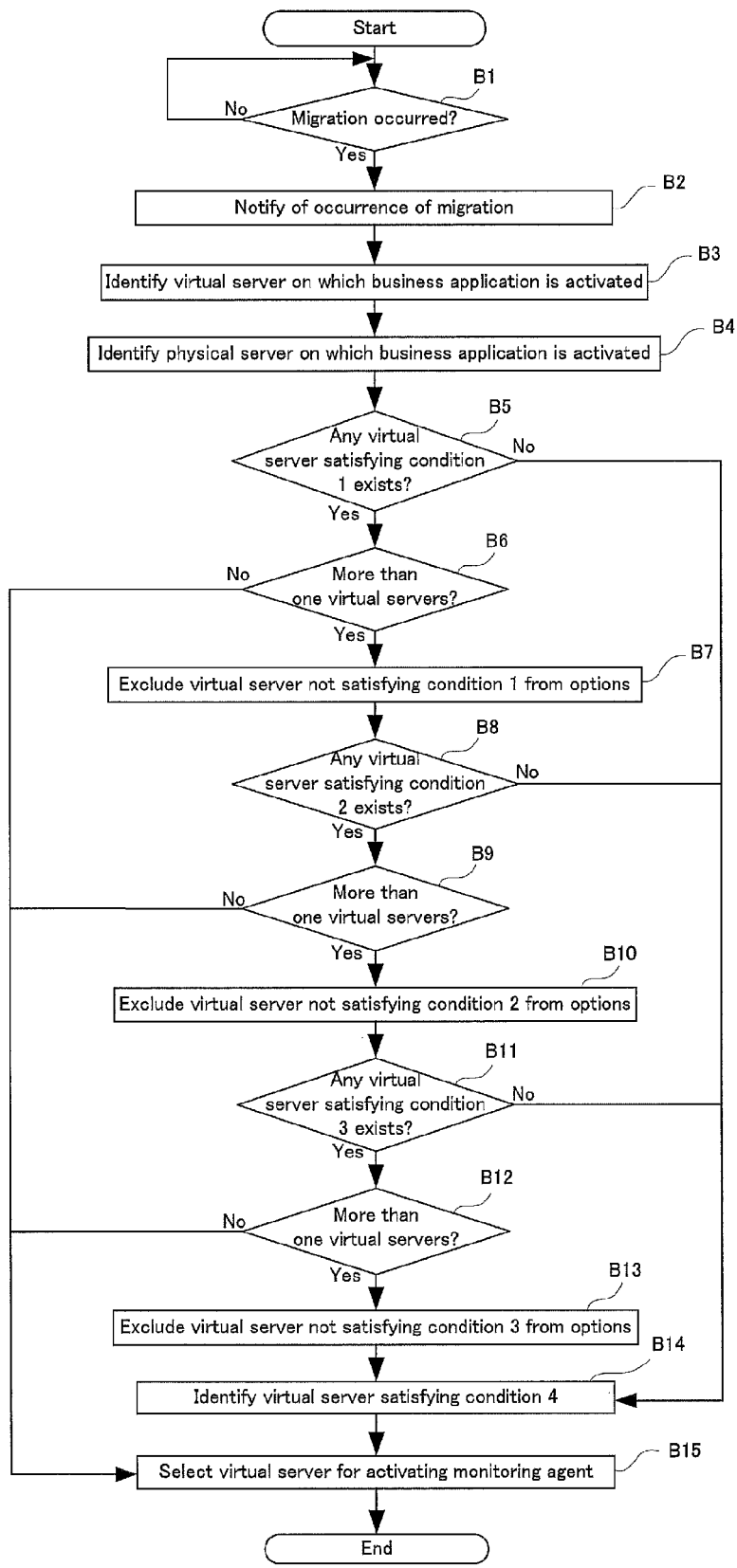
FIG. 5 is a flowchart showing an operation of the cluster monitor according to the second embodiment of the present invention.

First, as shown in FIG. 5, the migration detecting unit 25 regularly accesses the virtualization platform management devices 330 and 340 to check the physical servers on which the virtual platforms are operating, and determines whether or not a migration (see FIG. 6) has occurred (step B1).

If no migration has occurred as a result of determination in step B1, the migration detecting unit 25 enters a standby state, and again performs the step B1 after a lapse of a set time. On the other hand, if a migration has occurred as the result of determination in step B1, the migration detecting unit 25 notifies the business server identifying unit 21 thereof (step B2).

Note that in the above-described example, the migration detecting unit 25 detects occurrence of a migration by regularly accessing the virtualization platform management devices 330 and 340. However, this need not be the case. The second embodiment may alternatively employ a configuration in which the virtualization platform management devices 330 and 340 notify the migration detecting unit 25 of occurrence of a migration.

Next, after step A2 is performed, the business server identifying unit 21 accesses the business server storing unit 41 in response to the receipt of the notification from the migration detecting unit 25, and identifies the virtual server on which the business application is activated, based on the information stored in the business server storing unit 41 (step B3). Further, the business server identifying unit 21 causes the server check unit 24 to perform a check with respect to the virtualization platform management devices 330 and 340, and identifies the physical server on which the identified virtual server is operating, based on the check result (step B4). Note that steps B3 and B4 are the same as steps A3 and A4 shown in FIG. 3, respectively.

Next, the agent server selecting unit 22 performs steps B5 to B15 and applies conditions 1 to 4 in this order to select the virtual server on which the monitoring agent is to be activated, as in the first embodiment. Note that steps B5 to B15 are the same as steps A5 to A15 shown in FIG. 3, respectively.

Specifically, in the second embodiment, it is first determined that the virtual server 60, which is operating on the physical server 100, satisfies condition 1 (step B5). Because only one virtual server satisfies condition 1, the agent server selecting unit 22 selects the virtual server 60 as the virtual server on which the monitoring agent is to be activated (step B15). Thereafter, the agent server selecting unit 22 delivers this information to the agent instructing unit 23.

Further, the agent instructing unit 23 stops the monitoring agent 82 on the virtual server 80 that had been activated until immediately before this point in time, activates the monitoring agent 62 on the virtual server 60, and continues monitoring. Simultaneously, the virtual server 80, which has been registered in the agent server storing unit 42 as the server for activating the monitoring agent, is deleted therefrom, and the virtual server 60 is registered therein.

Program

The program according to the second embodiment need only be a program for causing a computer to perform steps B1 to B15 shown in FIG. 5. The cluster monitor 11 and the method for monitoring a cluster according to the second embodiment can be implemented by installing this program in the computer and executing it. In this case, a CPU (Central Processing Unit) of the computer works as the monitoring agent controller 20 and the business application controller 30 and performs processing.

Advantageous Effect of the Second Embodiment

Figure 6:
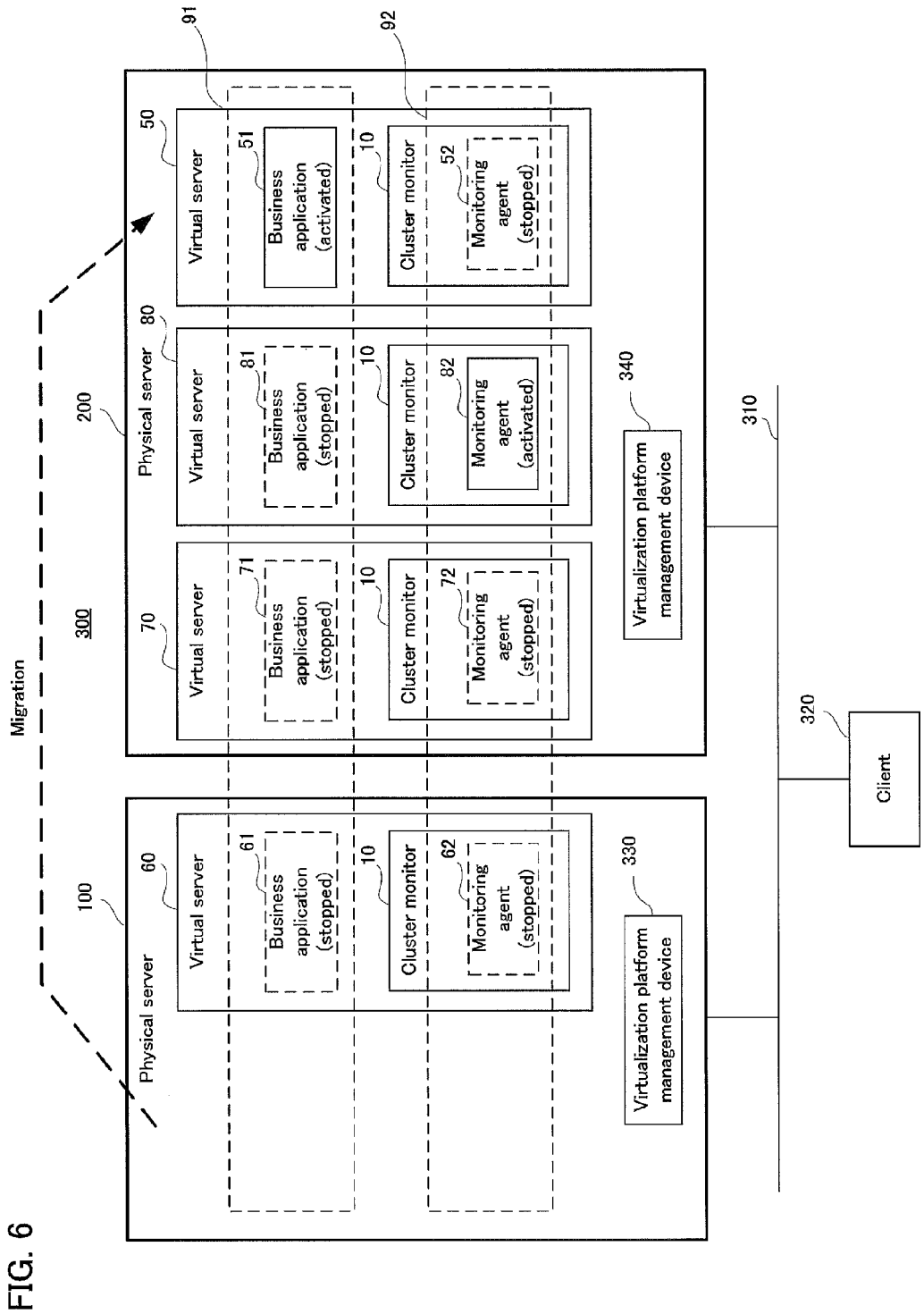
FIG. 6 is a diagram schematically showing the operation of the cluster monitor according to the second embodiment of the present invention.

As described above, according to the second embodiment, even if the configuration is changed during operation due to a migration from the outside or the like, monitoring can be continued from another physical server (see FIG. 6). Furthermore, even when the second embodiment is employed, the advantageous effect described in the first embodiment can be achieved.

OTHER EXAMPLES

The above-described first and second embodiments can be applied to cloud systems. In other words, cloud systems that have been used more widely in recent years are implemented using virtualization, and therefore the cluster monitor according to the first and second embodiments can be applied thereto. Furthermore, it can be considered that a high-availability cluster system is constructed within a cloud system that extends over a broad area. Even in this case, the cluster monitor according to the first and second embodiments can be applied. Further, in this case, as the conditions for identifying the server for activating the monitoring agent, a condition regarding closeness to the client may be provided in addition to the condition regarding whether or not the business application is activated on the physical server.

Furthermore, although only the example in which the monitoring agent is activated by the virtual server is described in the first and second embodiments, the first and second embodiments should not be limited thereto. In other words, the first and second embodiments may alternatively employ a configuration in which execution of the business application and activation of the monitoring agent are performed directly by physical servers. That is, the cluster monitor according to the first and second embodiments may also be applied to an HA cluster system constituted only by physical servers.

Figure 7:
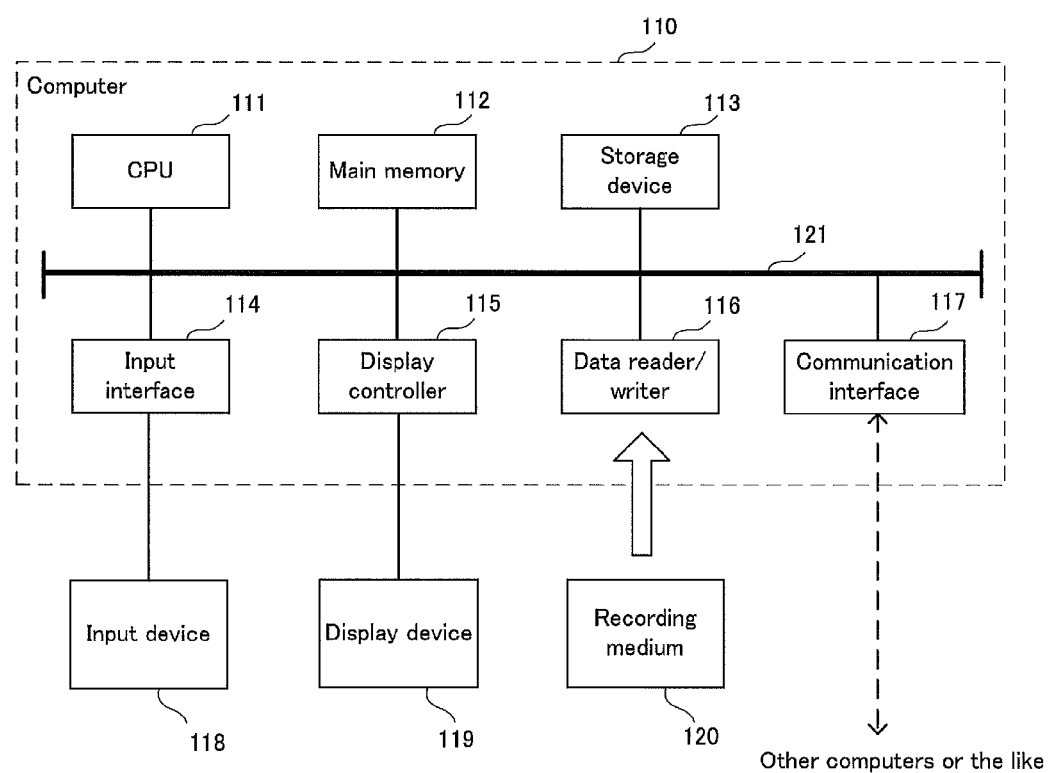
FIG. 7 is a block diagram showing an exemplary computer that realizes the cluster monitor according to the first and second embodiments of the present invention.

Here, a computer that implements the cluster monitor by executing the program according to the first and second embodiments will be described using FIG. 7. FIG. 7 is a block diagram showing an exemplary computer that implements the cluster monitor according to the first and second embodiments of the present invention.

As shown in FIG. 7, a computer 110 includes a CPU 111, a main memory 112, a storage device 113, an input interface 114, a display controller 115, a data reader/writer 116, and a communication interface 117. These components are mutually connected via a bus 121 so as to be able to exchange data.

The CPU 111 performs various calculations by deploying the program (code) according to the present embodiment stored in the storage device 113 in the main memory 112 and executing it in predetermined order. The main memory 112 typically is a volatile storage device such as a DRAM (Dynamic Random Access Memory). The program according to the present embodiments is provided in a state of being stored in a computer-readable recording medium 120. Note that the program according to the present embodiments may also be one distributed on the Internet to which connection is made via the communication interface 117.

Specific examples of the storage device 113 include a hard disk drive, as well as a semiconductor storage device such as a flash memory or the like. The input interface 114 intermediates data transmission between the CPU 111 and input devices 118 such as a keyboard and a mouse. The display controller 115 is connected to a display device 119 and controls display on the display device 119.

The data reader/writer 116 intermediates data transmission between the CPU 111 and the recording medium 120 to read the program from the recording medium 120 and writes a result of processing performed by the computer 110 onto the recording medium 120. The communication interface 117 intermediates data transmission between the CPU 111 and other computers.

Specific examples of the recording medium 120 include a general-purpose semiconductor storage device such as a CF (Compact Flash®) or an SD (Secure Digital), a magnetic storage medium such as a flexible disk, and an optical storage medium such as a CD-ROM (Compact Disk Read Only Memory).

Part or all of the above-described embodiments can be expressed with supplementary notes 1 to 15 described below, but is not limited to the following description.

Supplementary Note 1:
A cluster monitor for controlling activation of a business application program and a monitoring agent in a cluster system including a plurality of servers, the cluster monitor including:
a business server identifying unit that identifies a server on which the business application program is operating from among the plurality of servers; and an agent server selecting unit that selects a server for activating the monitoring agent from among the plurality of servers, based on the identified server.

Supplementary Note 2:
The cluster monitor according to supplementary note 1, wherein in a case where the monitoring agent is activated on one of the plurality of servers, if a failure occurs in the server on which the monitoring agent is activated, the business server identifying unit identifies, in response to the occurrence of the failure, the server on which the business application program is operating, and the agent server selecting unit selects a server for activating the monitoring agent.

Supplementary Note 3:
The cluster monitor according to supplementary note 1 or 2, wherein in a case where the monitoring agent is activated on one of the plurality of servers, if a failure relating to the business application program occurs and fail-over of the business application program is executed, the business server identifying unit identifies, in response to the execution of the fail-over, a server to take over the business application program due to the fail-over, and the agent server selecting unit selects a server for activating the monitoring agent.

Supplementary Note 4:
The cluster monitor according to any one of supplementary notes 1 to 3,
wherein each of the plurality of servers is a virtual server that operates in a virtual environment provided by one or more physical servers,
the business server identifying unit identifies a virtual server on which the business application program is operating from among a plurality of virtual servers, and
the agent server selecting unit selects a virtual server for activating the monitoring agent from among the plurality of virtual servers, based on the identified virtual server.

Supplementary Note 5:
The cluster monitor according to supplementary note 4,
further including a server check unit that acquires information for identifying a physical server that is operating the virtual server,
wherein the agent server selecting unit selects a virtual server for activating the monitoring agent from among the plurality of virtual servers, further using the acquired information.

Supplementary Note 6:
The cluster monitor according to supplementary note 4 or 5,
wherein the agent server selecting unit selects a virtual server for activating the monitoring agent, by applying at least one of four preset conditions, which are a first condition under which a priority is given to a virtual server that is operating on a physical server other than the physical server on which the identified virtual server is operating, a second condition under which a priority is given to a virtual server other than the identified virtual server, a third condition under which a priority is given to a virtual server operating on a physical server that is not operating an application program not being a target of monitoring by the monitoring agent, and a fourth condition under which a priority is given to a virtual server having a lowest priority according to which the business application program is operated.

Supplementary Note 7:
The cluster monitor according to any one of supplementary notes 4 to 6,
further including a migration detecting unit that detects a migration by which the physical server that is operating the virtual server is changed to another physical server,
wherein if the migration is detected by the migration detecting unit, the business server identifying unit again identifies the server on which the business application program is operating, and the agent server selecting unit again selects a server for activating the monitoring agent.

Supplementary Note 8:
The cluster monitor according to any one of supplementary notes 1 to 7,
further including a business application activating unit that identifies a server for operating the business application program from among the plurality of servers in accordance with the priorities set for the respective servers, and causes the identified server to operate the business application program.

Supplementary Note 9:

A method for monitoring a cluster by which activation of a business application program and a monitoring agent is controlled in a cluster system including a plurality of servers, the method including:

a step (a) of identifying a server on which the business application program is operating from among the plurality of servers; and a step (b) of selecting a server for activating the monitoring agent from among the plurality of servers, based on the identified server.

Supplementary Note 10:

The method for monitoring a cluster according to supplementary note 9, wherein in a case where the monitoring agent is activated on one of the plurality of servers, if a failure occurs in the server on which the monitoring agent is activated, the steps (a) and (b) are performed again in response to the occurrence of the failure.

Supplementary Note 11:

The method for monitoring a cluster according to supplementary note 9 or 10, wherein in a case where the monitoring agent is activated on one of the plurality of servers, if a failure relating to the business application program occurs and fail-over of the business application program is executed, the step (a) is performed again to identify, in response to the execution of the fail-over, a server to take over the business application program due to the fail-over from among the plurality of servers, and the step (b) is also performed again.

Supplementary Note 12:

The method for monitoring a cluster according to any one of supplementary notes 9 to 11, wherein each of the plurality of servers is a virtual server that operates in a virtual environment provided by one or more physical servers, in the step (a), a virtual server on which the business application program is operating is identified from among a plurality of virtual servers, and in the step (b), a virtual server for activating the monitoring agent is selected from among the plurality of virtual servers based on the identified virtual server.

Supplementary Note 13:

The method for monitoring a cluster according to supplementary note 12, further including a step (c) of acquiring information for identifying a physical server that is operating the virtual server, wherein in the step (b), the virtual server for activating the monitoring agent is selected from among the plurality of virtual servers, further using the information acquired in the step (c).

Supplementary Note 14:

The method for monitoring a cluster according to supplementary note 12 or 13, wherein in the step (b), a virtual server for activating the monitoring agent is selected by applying, in order, four preset conditions, which are a first condition under which a priority is given to a virtual server that is operating on a physical server other than the physical server on which the identified virtual server is operating, a second condition under which a priority is given to a virtual server other than the identified virtual server, a third condition under which a priority is given to a virtual server operating on a physical server that is not operating an application program not being a target of monitoring by the monitoring agent, and a fourth condition under which a priority is given to a virtual server having a lowest priority according to which the business application program is operated.

Supplementary Note 15:

The method for monitoring a cluster according to any one of supplementary notes 12 to 14, further including a step (d) of detecting a migration by which the physical server that is operating the virtual server is changed to another physical server, wherein if the migration is detected in the step (d), the steps (a) and (b) are performed again.

Supplementary Note 16:

The method for monitoring a cluster according to any one of supplementary notes 9 to 15, further including a step (e) of identifying a server for operating the business application program from among the plurality of servers in accordance with the priorities set for the respective servers, and causing the identified server to operate the business application program.

Supplementary Note 17:

A computer-readable recording medium having recorded therein a program for causing a computer to control activation of a business application program and a monitoring agent in a cluster system including a plurality of servers, the program including instructions that cause the computer to execute:

a step (a) of identifying a server on which the business application program is operating from among the plurality of servers; and a step (b) of selecting a server for activating the monitoring agent from among the plurality of servers, based on the identified server.

Supplementary Note 18:

The computer-readable recording medium according to appendix 17, wherein in a case where the monitoring agent is activated on one of the plurality of servers, if a failure occurs in the server on which the monitoring agent is activated, the computer is caused to again perform the steps (a) and (b) in response to the occurrence of the failure.

Supplementary Note 19:

The computer-readable recording medium according to supplementary note 17 or 18, wherein in a case where the monitoring agent is activated on one of the plurality of servers, if a failure relating to the business application program occurs and fail-over of the business application program is executed, the computer is caused to again perform the step (a) to identify, in response to the execution of the fail-over, a server to take over the business application program due to the fail-over from among the plurality of servers, and is also caused to again perform the step (b).

Supplementary Note 20:

The computer-readable recording medium according to any one of supplementary notes 17 to 19, wherein each of the plurality of servers is a virtual server that operates in a virtual environment provided by one or more physical servers, in the step (a), a virtual server on which the business application program is operating is identified from among a plurality of virtual servers, and in the step (b), a virtual server for activating the monitoring agent is selected from among the plurality of virtual servers, based on the identified virtual server.

Supplementary Note 21:

The computer-readable recording medium according to supplementary note 20, wherein the program further includes instructions that cause the computer to execute:

a step (c) of acquiring information for identifying a physical server that is operating the virtual server, wherein in the step (b), the virtual server for activating the monitoring agent is selected from among the plurality of virtual servers, further using the information acquired in the step (c).

Supplementary Note 22:

The computer-readable recording medium according to supplementary note 20 or 21, wherein in the step (b), a virtual server for activating the monitoring agent is selected by applying, in order, four preset conditions, which are a first condition under which a priority is given to a virtual server that is operating on a physical server other than the physical server on which the identified virtual server is operating, a second condition under which a priority is given to a virtual server other than the identified virtual server, a third condition under which a priority is given to a virtual server operating on a physical server that is not operating an application program not being a target of monitoring by the monitoring agent, and a fourth condition under which a priority is given to a virtual server having a lowest priority according to which the business application program is operated.

Supplementary Note 23:

The computer-readable recording medium according to any one of supplementary notes 20 to 22, wherein the program further includes instructions that cause the computer to execute:

a step (d) of detecting a migration by which the physical server that is operating the virtual server is changed to another physical server, wherein if the migration is detected in the step (d), the computer is caused to again perform the steps (a) and (b).

Supplementary Note 24:

The computer-readable recording medium according to any one of supplementary notes 17 to 23, wherein the program further includes instructions that cause the computer to execute:

a step (e) of identifying a server for operating the business application program among the plurality of servers in accordance with the priorities set for the respective servers, and causing the identified server to operate the business application program.

As described above, according to the present invention, it is possible to dynamically switch a location for activating the monitoring agent in a cluster system and distribute the load on the cluster system. The present invention is particularly useful for a high-availability cluster system constructed in a virtualized environment (including a cloud system).

While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims.

What is claimed is:

1. A cluster monitor for controlling activation of a business application program and a monitoring agent in a cluster system including a plurality of servers, comprising:

a business server identifying unit that identifies a server on which the business application program is operating from among the plurality of servers; and an agent server selecting unit that selects a server for activating the monitoring agent from among the plurality of servers, based on the identified server.

2. The cluster monitor according to claim 1, wherein in a case where the monitoring agent is activated on one of the plurality of servers, if a failure occurs in the server on which the monitoring agent is activated, the business server identifying unit identifies, in response to the occurrence of the failure, the server on which the business application program is operating, and the agent server selecting unit selects a server for activating the monitoring agent.

3. The cluster monitor according to claim 1, wherein in a case where the monitoring agent is activated on one of the plurality of servers, if a failure relating to the business application program occurs and fail-over of the business application program is executed, the business server identifying unit identifies, in response to the execution of the fail-over, a server to take over the business application program due to the fail-over, and the agent server selecting unit selects a server for activating the monitoring agent.

4. The cluster monitor according to claim 1, wherein each of the plurality of servers is a virtual server that operates in a virtual environment provided by one or more physical servers, the business server identifying unit identifies a virtual server on which the business application program is operating from among a plurality of virtual servers, and the agent server selecting unit selects a virtual server for activating the monitoring agent from among the plurality of virtual servers, based on the identified virtual server.

5. The cluster monitor according to claim 4, further comprising a server check unit that acquires information for identifying a physical server that is operating the virtual server, wherein the agent server selecting unit selects a virtual server for activating the monitoring agent from among the plurality of virtual servers, further using the acquired information.

6. The cluster monitor according to claim 4, wherein the agent server selecting unit selects a virtual server for activating the monitoring agent, by applying at least one of four preset conditions, which are a first condition under which a priority is given to a virtual server that is operating on a physical server other than the physical server on which the identified virtual server is operating, a second condition under which a priority is given to a virtual server other than the identified virtual server, a third condition under which a priority is given to a virtual server operating on a physical server that is not operating an application program not being a target of monitoring by the monitoring agent, and a fourth condition under which a priority is given to a virtual server having a lowest priority according to which the business application program is operated.

7. The cluster monitor according to claim 4, further comprising a migration detecting unit that detects a migration by which the physical server that is operating the virtual server is changed to another physical server, wherein if the migration is detected by the migration detecting unit, the business server identifying unit again identifies the server on which the business application program is operating, and the agent server selecting unit again selects a server for activating the monitoring agent.

8. The cluster monitor according to claim 1, further comprising a business application activating unit that identifies a server for operating the business application program from among the plurality of servers in accordance with the priorities set for the respective servers, and causes the identified server to operate the business application program.

9. A method for monitoring a cluster by which activation of a business application program and a monitoring agent is controlled in a cluster system including a plurality of servers, comprising:
- a step (a) of identifying a server on which the business application program is operating from among the plurality of servers; and
- a step (b) of selecting a server for activating the monitoring agent from among the plurality of servers, based on the identified server.

10. A computer-readable recording medium having recorded therein a program for causing a computer to control activation of a business application program and a monitoring agent in a cluster system including a plurality of servers, the program including instructions that cause the computer to execute:
- a step (a) of identifying a server on which the business application program is operating from among the plurality of servers; and
- a step (b) of selecting a server for activating the monitoring agent from among the plurality of servers, based on the identified server.

* * * * *